US007404090B1

United States Patent
Lewicki et al.

(10) Patent No.: US 7,404,090 B1
(45) Date of Patent: Jul. 22, 2008

(54) DEVICE AND COMPUTER SYSTEM FOR POWER MANAGEMENT USING SERIAL LINK CONNECTIONS

(75) Inventors: Laurence Lewicki, Sunnyvale, CA (US); Nicolas Nodenot, Mountain View, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 470 days.

(21) Appl. No.: 10/966,885

(22) Filed: Oct. 15, 2004

(51) Int. Cl.
*G06F 1/00* (2006.01)
*G06F 1/26* (2006.01)
*G06F 1/32* (2006.01)
*G06F 11/30* (2006.01)

(52) U.S. Cl. .................. 713/300; 713/310; 713/320; 713/330; 713/340

(58) Field of Classification Search .......... 713/300–340
See application file for complete search history.

(56) References Cited

U.S. PATENT DOCUMENTS

| | | | | |
|---|---|---|---|---|
| 4,768,190 A | * | 8/1988 | Giancarlo | 370/400 |
| 4,876,738 A | * | 10/1989 | Selby | 455/435.1 |
| 5,408,668 A | * | 4/1995 | Tornai | 713/324 |
| 6,005,761 A | * | 12/1999 | Izawa et al. | 361/103 |
| 6,021,506 A | * | 2/2000 | Cho et al. | 713/601 |
| 6,623,157 B1 | * | 9/2003 | Fujisawa et al. | 368/187 |
| 6,657,534 B1 | * | 12/2003 | Beer et al. | 340/3.1 |
| 7,072,406 B1 | * | 7/2006 | Harma et al. | 375/257 |
| 7,152,170 B2 | * | 12/2006 | Park | 713/320 |
| 7,178,045 B2 | * | 2/2007 | Puffer et al. | 713/300 |
| 7,200,379 B2 | * | 4/2007 | Edwards et al. | 455/343.1 |
| 7,249,271 B2 | * | 7/2007 | Shibata et al. | 713/324 |
| 2004/0019726 A1 | | 1/2004 | Kelley et al. | |
| 2004/0039986 A1 | | 2/2004 | Solomon et al. | |
| 2005/0104623 A1 | * | 5/2005 | Guo et al. | 326/82 |
| 2005/0228925 A1 | * | 10/2005 | Jolly et al. | 710/305 |

* cited by examiner

*Primary Examiner*—Rehana Perveen
*Assistant Examiner*—Michael J Brown

(57) ABSTRACT

Power management for a computer system and device is accomplished by implementing two separate power modes in a serially-connected device, and selecting from the two power modes depending on the state of a receiver in the device. A signal detector within the receiver is connected to a serial interface port of the device to detect the presence of an input signal. A power controller selects a first power mode for the device when the signal detector detects the input signal and a second power mode for the device when the input signal is not detected by the signal detector.

20 Claims, 3 Drawing Sheets

DEVICE AND COMPUTER SYSTEM FOR POWER MANAGEMENT USING SERIAL LINK CONNECTIONS

TECHNICAL FIELD OF THE INVENTION

The present invention is generally directed to power management, and, more particularly, to managing power in computer systems utilizing serial link connections.

BACKGROUND OF THE INVENTION

In modern computer systems, an input/output (I/O) subsystem enables communication between a central processor and one or more peripheral devices, such as a disk drive, modem, graphics card, keyboard, mouse, sound card or print driver. The I/O subsystem is typically implemented according to a standard I/O specification, such as the parallel bus implementation described in the Peripheral Components Interconnect (PCI) Local Bus Specification, Rev. 2.3, dated Mar. 29, 2002.

In the future, to increase performance and scalability, the parallel bus implementation will likely be replaced by a serial interface implementation, such as the one described in PCI Express Base Specification, Rev. 1.0a, dated Apr. 15, 2003 (hereinafter "PCI Express"). Serial I/O subsystems are composed of serial point-to-point unidirectional or bi-directional packet-switched links between devices (or components) in the computer system.

Although the data rates achievable with serial I/O interfaces are much higher than that achievable with traditional I/O parallel buses, the power required to drive such serial I/O interfaces is significantly higher than that for a parallel bus. In all computer systems, and especially in battery-driven portable computer systems, such as laptop computers, personal digital assistants, wireless or cellular telephones and other such devices, power management is an important factor in determining whether to replace the parallel bus with serial I/O interfaces.

It is therefore desirable to provide for efficient power management in computer systems and devices utilizing serial link connections.

SUMMARY OF THE INVENTION

To address the above-discussed deficiencies of the prior art, it is a primary object of the present invention to provide for efficient power management in computer systems utilizing serial link connections.

According to exemplary embodiments of the invention, power management can be accomplished by implementing two separate power modes in a device, and selecting from the two power modes depending on the state of a receiver in the device. A signal detector within the receiver is connected to a serial interface port of the device to detect the presence of an input signal. A power controller selects a first power mode for the device when the signal detector detects the input signal and a second power mode for the device when the input signal is not detected by the signal detector.

In one embodiment, the first power mode is provided by a main power supply, while the second power mode is provided by an auxiliary power supply. While the receiver is operating in the second power mode, the main power supply to a transmitter of the device is turned off. When the signal detector in the receiver detects an input signal, the main power supply to both the transmitter and receiver is turned on.

The foregoing has broadly outlined the features and technical advantages of the present invention so that those skilled in the art may better understand the detailed description that follows. Additional features and advantages of the invention will be described below that form the subject of the claims of the invention. Those skilled in the art will appreciate that they may readily use the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it is advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, cooperate with, be proximate to, be bound to or with, have a property of, or the like. The terms "controller," "processor" and "apparatus" mean any device, system or part thereof that controls at least one operation. Such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Exemplary embodiments of the invention provide an efficient power management technique for a computer system that utilizes serial link connections. As used herein, the term "link" refers to a transmission medium capable of transmitting data between devices within a computer system. As further used herein, the term "serial link" refers to a transmission medium capable of providing serial point-to-point unidirectional or bidirectional packet-switched communication between devices in the computer system.

Figure 1:
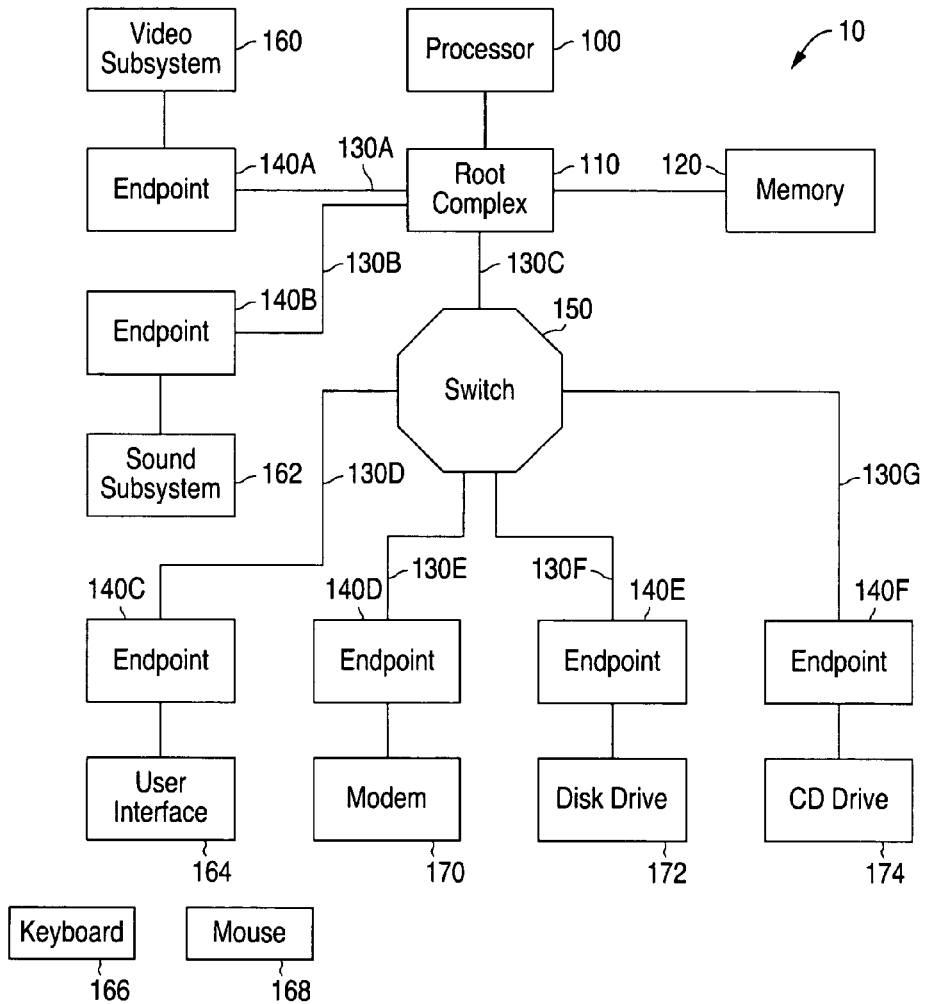
FIG. 1 is a block diagram illustrating an exemplary computer system employing serial link connections in accordance with embodiments of the present invention.

FIG. 1 illustrates an exemplary computer system 10 employing serial link connections in accordance with embodiments of the present invention. The computer system 10 shown in FIG. 1 may include a server, personal computer, laptop computer, is wireless device (e.g., telephone, pager, or PDA), or alternatively, may be a part of a computer network configured with a plurality of computing devices connected over one or more local area networks ("LANs"), metropolitan area networks ("MANs"), wide area networks ("WANs"), all or portions of a global network such as the Internet, or any other communication system or systems at one or more locations.

The exemplary computer system 10 includes a processor 100 and a memory 120 connected to communicate with a plurality of peripheral devices through a root complex 110. Examples of peripheral devices include a video subsystem 160, which may include a graphics card, a sound subsystem 162, which may include a sound card, a keyboard 166, a mouse 168, a modem 170, a disk drive 172 and a CD drive 174. However, it should be understood that the peripheral devices shown in FIG. 1 are for illustration only, and the present invention is applicable to any type of peripheral device in a computer system 10. In general, a "peripheral device" refers to any device that provides inputs to or receives outputs from the processor 100.

The processor 100 includes any hardware, software, firmware, or combination thereof for receiving data packets from the peripheral devices and transmitting data packets to the peripheral devices. For example, the processor 100 may include one or more microprocessors, microcontrollers, programmable logic devices, digital signal processors or other type of processing devices that are configured to execute instructions of a computer program, and one or more memories (e.g., cache memory) that store the instructions and other data used by the processor 100. However, it should be understood that other embodiments of the processor 100 may be used.

The memory 120 is any type of data storage device, including but not limited to, a hard drive, random access memory (RAM), read only memory (ROM), compact disc, floppy disc, ZIP® drive, tape drive, database or other type of storage device or storage medium.

The root complex 110 denotes the root of an I/O hierarchy that connects the processor 100 and memory 120 to the peripheral devices. Serial links 130A and 130B connect the root complex 110 to respective endpoints 140A and 140B in the computer system 10. As used herein, the term "endpoint" refers to a device that is capable of transmitting and receiving serialized data for use by itself or on behalf of another device. For example, as shown in FIG. 1, endpoint 140A transmits and receives serialized data on behalf of the video subsystem 160, while endpoint 140B transmits and receives serialized data on behalf of the sound subsystem 162. However, it should be understood that in other embodiments, the video subsystem 160 and sound subsystem 162 may be endpoints.

The root complex 110 is further shown connected to a switch 150 via serial link 130C. The switch 150 serves to connect multiple peripheral devices to the root complex 110. Thus, the switch 150 is connected to a number of additional endpoints 140C, 140D, 140E and 140F through respective serial links 130D, 130E, 130F and 130G. For example, as shown in FIG. 1, endpoint 140C is connected through a user interface 164 to the keyboard 166 and mouse 168. Endpoint 140D is connected to the modem 170 to selectively enable the computer system 10 to establish a communication link with a network, such as the Internet. Endpoint 140E is connected to the disk drive 172 and endpoint 140F is connected to the CD drive 174.

Figure 2:
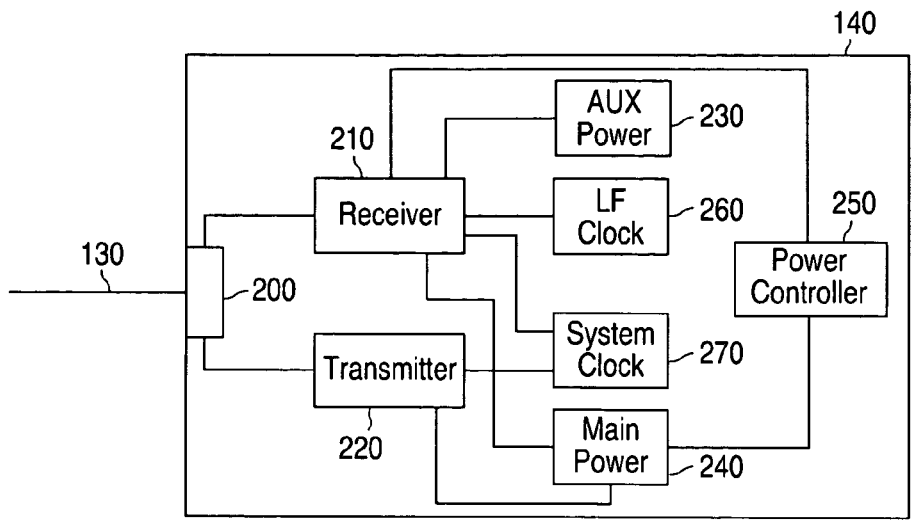
FIG. 2 is a block diagram illustrating an exemplary endpoint within the computer system of FIG. 1 in accordance with embodiments of the present invention.

FIG. 2 illustrates an exemplary endpoint 140 within the computer system 10 of FIG. 1 in accordance with embodiments of the present invention. The endpoint 140 includes a serial interface port 200 connected to a serial link 130. The serial interface port 200 is connected to a receiver portion 210 and a transmitter portion 220. It should be understood that the serial interface port 200 may include both an egress port connected to the transmitter 220 to transmit serialized data packets over the serial link 130 and an ingress port connected to the receiver 210 to receive serialized data packets from the serial link 130. It should further be understood that in other embodiments, two unidirectional serial links 130 may be connected to the serial interface port, one for transmitting and one for receiving.

The receiver 210 includes a receiver buffer or queue (not specifically shown) for storing data received over the serial link 130 at the endpoint 140, and the transmitter includes a transmit buffer or queue (not specifically shown) for storing data to be transmitted over the serial link 130 from the endpoint 140. The receiver 210 and transmitter 220 are both connected to a main power supply 240 and a system clock 260.

In accordance with embodiments of the present invention, the receiver 210 is further connected to an auxiliary power supply 230 and a low frequency clock 260. A power controller 250 is connected to the main power supply 240 to selectively turn on and turn off the main power supply 240 to both the transmitter 220 and the receiver 210. In addition, the power controller 250 is connected to the receiver 210 to receive an indication from the receiver 210 whether the main power supply 240 should be turned on or turned off.

In one embodiment, the main power supply 240 is a low voltage power supply, e.g., 1.8 V, and the auxiliary power supply 230 is a high voltage power supply providing a voltage higher than that provided by the main power supply 240. In a further embodiment, the system clock 270 is a high frequency, crystalline clock capable of providing a clock signal at high frequencies, and the low frequency clock 260 is a jittery, low-frequency oscillator capable of providing a clock signal at frequencies lower than that provided by the system clock 270.

In one power management embodiment, the endpoint 140 operates in a first power mode when the main power supply 240 is turned on to both the transmitter 220 and the receiver 210, and a second power mode when the main power supply 240 is turned off to both the transmitter 220 and the receiver 210. In the first power mode, the receiver 210 uses the system clock 270 to recover data received at the serial interface port 200. For example, the receiver 210 may use a CDR loop to lock on the input bit sequence and maximize the signal-to-noise ratio (SNR) by aligning the phase of the local system clock 270 to the center of the eye. In the second power mode, the receiver 210 is powered by only the auxiliary power supply 230, and only the low frequency clock 260 is available to the receiver 210.

The receiver 210 is configured to inform the power controller 250 of the state of the receiver 210 for use by the power controller 250 in determining whether to operate in the first power mode or the second power mode. For example, in a first state, the receiver 210 is active and receiving data over the serial link 130, while in a second state, the receiver 210 is idle and not receiving any data over the serial link 130. In the first receiver state, the power controller 250 turns on the main power supply 240 to both the transmitter 220 and the receiver 210. In the second receiver state, the power controller 250 turns off the main power supply 240 to both the transmitter 220 and the receiver 210.

While in an idle state, the receiver 210 is powered by the auxiliary power supply 230 and clocked by the low frequency clock 260 in order to detect the presence of an input signal at the receiver 210 and transition to the active state. Typically, prior to entering the active state, the serial link 130 is initialized to "wake up" the receiver 210. Initialization usually includes a "hand shaking" phase during which the receiver 210 receives a low frequency link initialization pattern composed of known repetitive data sequences. Once the "hand shaking" phase is complete, the serial link 130 is initialized, and the receiver 210 transitions to the active state to receive serialized data streams.

Once the low frequency link initialization pattern is detected by the receiver 210, the receiver 210 notifies the power controller 250 that the receiver 210 is transitioning to the active state, and the power controller 250 turns on the main power supply 240 to both the transmitter 220 and the receiver 210. In other embodiments, the transmitter 220 power mode is independent of the receiver 210 power mode, such that the main power supply 240 to the transmitter 220 is turned on regardless of the power mode that the receiver 210 is in.

The main power supply 240 enables the receiver 210 to be clocked by the system clock 270. The receiver 210 remains in the active state until the receiver 210 no longer detects the presence of an input signal (e.g., serialized data stream) for a predetermined period of time at the receiver 210. The predetermined period of time can be nearly instantaneous (e.g., one system clock cycle) or any other number of system clock cycles.

Figure 3:
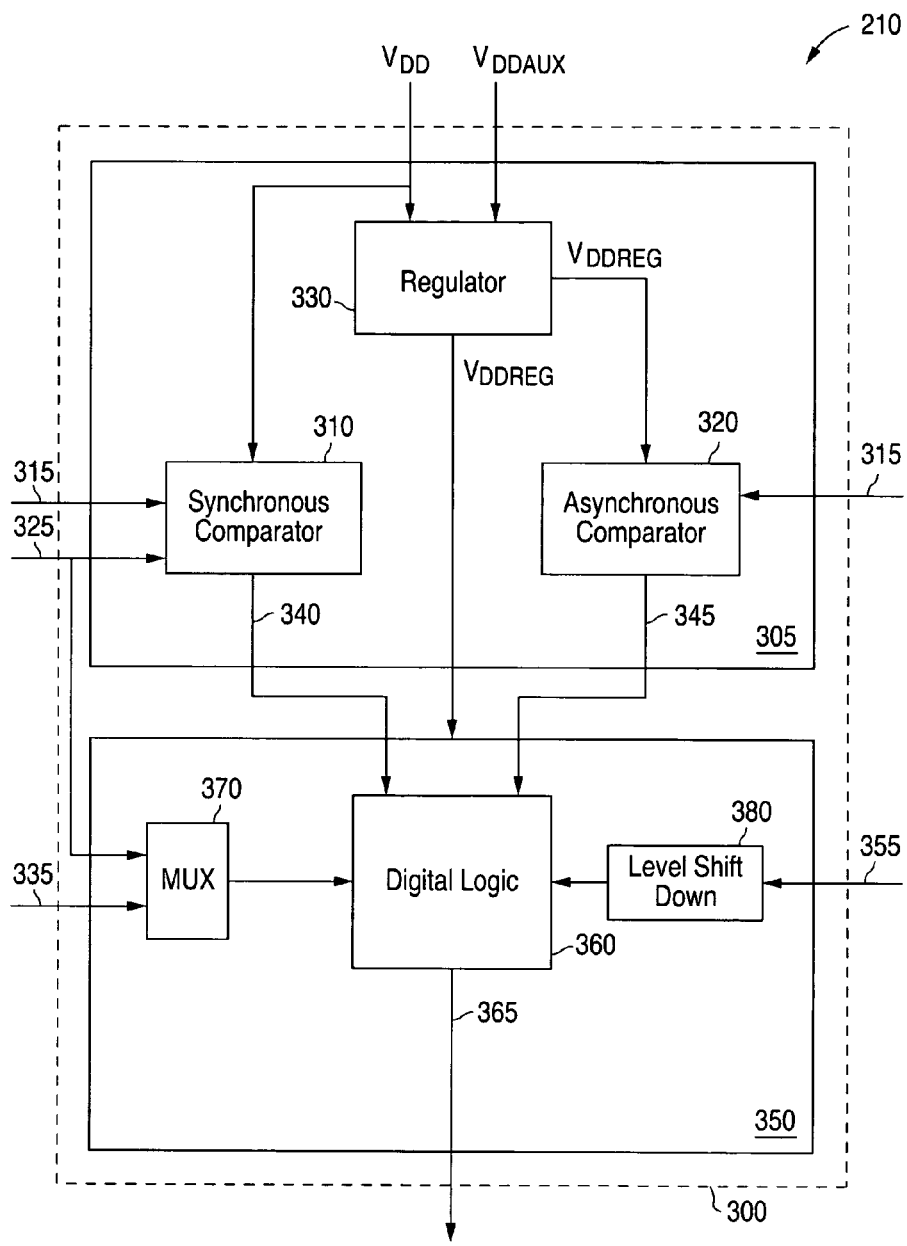
FIG. 3 is a block diagram illustrating an exemplary receiver of the endpoint shown in FIG. 2 in accordance with embodiments of the present invention.

FIG. 3 is a block diagram illustrating an exemplary receiver 210 of the endpoint shown in FIG. 2 in accordance with embodiments of the present invention. Within the receiver 210 is a signal detector 300 capable of detecting the presence of a signal at the receiver 210 and providing an output 395 to the power controller 250 (shown in FIG. 2). The output 395 can be any type of signal used by the power controller 250 to determine the power mode for the endpoint 140. For example, the output 395 can be a digital one when the signal detector 300 detects a signal (e.g., the receiver is either already in or transitioning to the active state) and a zero otherwise (e.g., the receiver is either already in or transitioning to the idle state).

The signal detector 300 includes an analog portion 305 and a digital portion 350. The analog portion 305 includes a synchronous comparator 310 and an asynchronous comparator 320, each for detecting a signal, while the digital portion 350 includes digital logic 360 for filtering the output of the synchronous comparator 310 and the asynchronous comparator 320 to avoid spurious signal detection.

Using the power mode example described above, when the receiver 210 is operating in the first power mode, the main power supply to the receiver 210 is turned on, and $V_{DD}$ is supplied to the synchronous comparator 310. The synchronous comparator 310 is clocked by the system clock, which is synchronized to the input bit stream 315. Thus, the clock signal 325 produced by the system clock is used to trigger the synchronous comparator 310 to obtain a measurement of the signal strength of the input bit stream 315. In one embodiment, the signal strength measurement is an eye opening measurement from data sampled at the center of the eye.

When the synchronous comparator detects a signal (e.g., a serialized data input stream) at the receiver 210, the output 340 of the synchronous comparator 310 indicates the presence of a signal. For example, the output 340 can be a digital one when the synchronous comparator 310 detects a signal and a zero otherwise.

When the receiver is operating in the second power mode, the main power supply to the receiver 210 is turned off, and therefore, the only power available to the receiver 210 is the auxiliary power $V_{DDaux}$. Although the receiver 210 is in an idle state in the second power mode, and the expected input "hand shake" signal is a lower frequency signal than a normal serialized data stream, the bandwidth necessary for detection of the low frequency link initialization pattern typically requires is fast comparator devices that are not able to operate at the auxiliary power level $V_{DDaux}$. Therefore, a regulator 330 is used to regulate the auxiliary power $V_{DDaux}$ at the voltage level of the main power to produce $V_{DDreg}$ when the receiver 210 is in the second power mode.

Therefore, $V_{DDreg}$ is supplied to the asynchronous comparator 320 to detect the presence of the low frequency link initialization pattern in the input bit stream 315. The asynchronous comparator 320 is not clocked by any clock, and therefore, operates as a free running amplifier that detects any signal presenting a spectrum within it's bandwidth. For example, in one embodiment, the asynchronous comparator 320 performs an envelope or peak detection.

Figure 4:
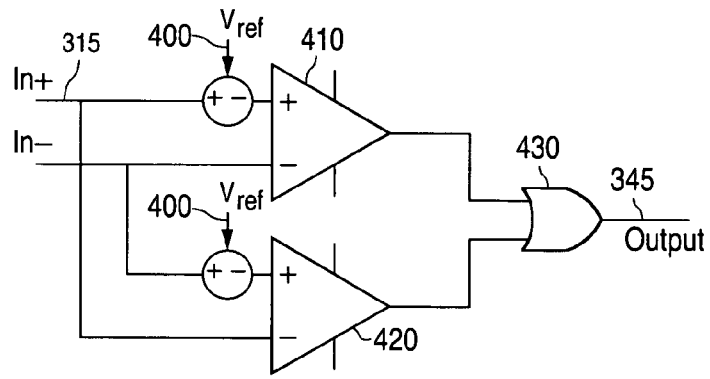
FIG. 4 is a circuit schematic illustrating an exemplary comparator for detecting a signal in accordance with embodiments of the present invention.

In FIG. 4, an exemplary asynchronous comparator 320 for detecting a signal is shown. It should be understood that the topology shown in FIG. 4 is applicable to any type of comparator (e.g., synchronous or asynchronous) for any type of signal detection (e.g., peak or eye height measurement). The input signal 315 is applied to a set of differential amplifiers 410 and 420. A threshold (or offset) voltage ($V_{ref}$) 400 is added to one of the inputs of each of the differential amplifiers 410 and 420. The sign of the threshold voltage 400 applied to one of the differential amplifiers 410 is opposite that applied to the other differential amplifier 420. When the differential amplifiers 410 and 420 detect either a positive or negative is peaking of the input 315 higher than $V_{ref}$, the output 345 of an OR gate 430 of the asynchronous comparator 320 indicates the presence of a signal (e.g., a low frequency link initialization pattern). In the example shown in FIG. 4, the output 345 is a digital one when the asynchronous comparator 320 detects a signal and a zero otherwise.

Referring again to FIG. 3, the outputs 340 and 345 of the synchronous comparator 310 and asynchronous comparator 320, respectively, are input to the digital logic 360. As used herein, the term "logic" refers to any hardware, software and/or firmware capable of performing one or more logical operations.

When the receiver 210 is in the first power mode, the synchronous comparator 310 is operating to produce output 340. To save power, in the first power mode, the asynchronous comparator 320 may be turned off. However, in the second power mode, the main power supply is turned off, and therefore, the synchronous comparator 310 does not produce an output 340. As a result, in the second power mode, only the asynchronous comparator 320 produces an output 345.

Control bits 355 from a higher layer in the receiver 210 are input to the digital logic 360 via a level shift down 380. The control bits 355 indicate which power mode the receiver is currently in. For example, the higher layer may be a media access controller associated with the power controller 250 (shown in FIG. 1). If the control bits 355 indicate that the receiver 210 is operating in the first power mode (e.g., operating at main power), the digital logic 360 selects the output 340 of the synchronous comparator 310, and the system clock signal 325 is input to the digital logic 360 via multiplexer (mux) 370. If the control bits 355 indicate that the receiver is operating in the second power mode (e.g., auxiliary power), the digital logic 360 receives only the output 345 of the asynchronous comparator 320, and the low frequency clock signal 355 is input to the digital logic 360 via mux 370.

The digital logic 360 filters the selected output 340 or 345 to ensure that a true signal is either detected or not detected. The output 365 of the digital logic 360 is the output 365 of the signal detector 300 that indicates whether or not a signal is present at the receiver 210.

Figure 5:
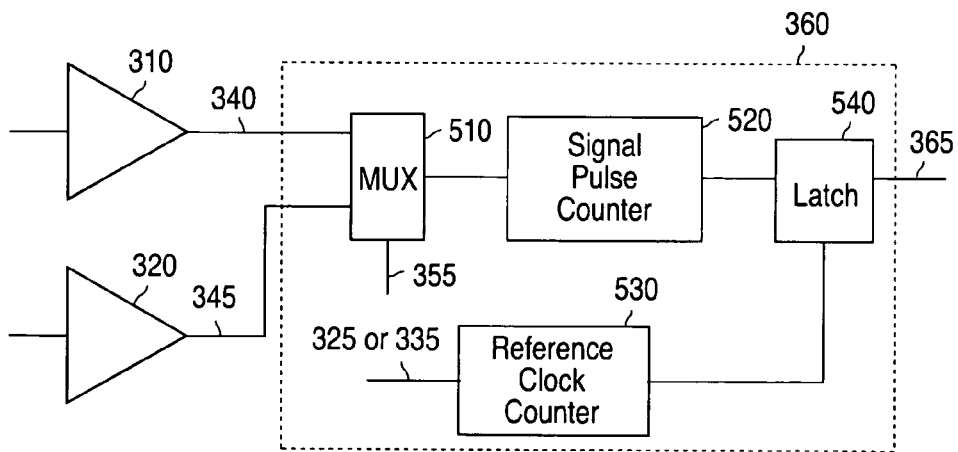
FIG. 5 is a circuit schematic illustrating exemplary digital logic for avoiding spurious signal detection in accordance with embodiments of the present invention.

FIG. 5 is a circuit schematic illustrating exemplary digital logic 360 for avoiding spurious signal detection in accordance with embodiments of the present invention. The digital logic 360 includes a mux 510, a signal pulse counter 520, a reference clock counter 530 and a latch 540.

The outputs 340 and 345 of the synchronous comparator 310 and the asynchronous comparator 320, respectively, are input to the mux 510. The mux 510 selects one of the outputs 340 and 345 based on the control bits 355, which indicate the power mode that the receiver 210 is currently in. The selected output 340 or 345 is input to the signal pulse counter 520 to count the is number of pulses (e.g., digital logic ones, each indicating the presence of a signal) in the selected output 340 or 345. In addition, the clock signal 325 or 335 associated with the current power mode is input to the reference clock counter 530 to count the number of clock cycles in the clock signal 325 or 335.

Thus, for example, if the receiver is in the first power mode, the mux 510 selects the output 340 of the synchronous comparator 310 for input to the signal pulse counter 520. Likewise, the system clock signal 325 is input to the reference clock counter 530. If the receiver is in the second power mode, the mux 510 selects the output 345 of the asynchronous comparator 320 for input to the signal pulse counter 520. In addition, the low frequency clock signal 335 is input to the reference clock counter 530.

The reference clock counter 530 and the signal pulse counter 520 are both reset substantially simultaneously, and each begin counting received pulses or cycles. The reference clock counter 530 is set at a predetermined number of cycles, and the signal pulse counter 520 is set at a predetermined number of pulses based on the level of confidence desired in the output 365 of the digital logic 160. If the reference clock counter 530 overflows (e.g., the number of clock cycles counted by the reference clock counter 530 exceeds the predetermined number of cycles) before the signal pulse counter 520 overflows, the output of the reference clock counter 530 latches the output of the signal pulse counter 520, and the output 365 of the digital logic 360 indicates that no signal was detected. However, if the signal pulse counter 520 overflows (e.g., the number of pulses counted by the signal pulse counter 520 exceeds the predetermined number of pulses) before the reference clock counter 530 overflows, the output 365 of the digital logic 360 indicates that a signal was detected.

As an example, if the reference clock counter 530 is set to 16 cycles and the signal pulse counter is set to 3 pulses, a signal is detected by the digital logic 360 if the output 340 of the synchronous comparator 310 or the output 345 of the asynchronous comparator 320 includes at least three pulses within 16 clock cycles. Once three pulses are detected, if the reference clock counter 530 has not yet counted 16 clock cycles, and therefore, not latched the output of the signal pulse counter 520, the output 365 of the digital logic 360 indicates the presence of a signal at the receiver.

Although the present invention has been described in detail, those skilled in the art should understand that they can make various changes, substitutions and alterations herein without departing from the spirit and scope of the invention in its broadest form. For example, although the present invention has been described above as applying to PCI Express, it should be understood that the present invention is applicable to any serial I/O interconnect, such as Rapid I/O and HyperTransport implementations.

What is claimed is:

1. A device, comprising:
    a serial interface port connected to a serial link;
    a signal detector connected to said serial interface port to detect the presence of a signal received at said serial interface port, the signal detector including a synchronous comparator and an asynchronous comparator; and
    a power controller connected to said signal detector to select a first power mode for said device when said signal detector detects said signal and a second power mode for said device when said signal is not detected by said signal detector,
    wherein the asynchronous comparator is turned off in the first power mode and turned on in the second power mode.

2. The device of claim 1, wherein said signal is one of a low frequency link initialization pattern or a serialized data input stream.

3. The device of claim 1, wherein said asynchronous comparator compares an input received at said serial interface port with a first threshold to detect said signal.

4. The device of claim 3, wherein said asynchronous comparator detects said signal when said input is higher than a positive threshold or lower than a negative threshold.

5. The device of claim 3, wherein said second power mode has a lower voltage than said first power mode, said signal detector operating in said second power mode until said signal is detected by said asynchronous comparator.

6. The device of claim 5, wherein said second power mode also includes an auxiliary power supply regulated at the voltage level of said first power mode.

7. The device of claim 5, wherein said synchronous comparator compares said input with a second threshold to detect said signal.

8. The device of claim 7, wherein said synchronous comparator detects said signal when said input is higher than a positive threshold or lower than a negative threshold.

9. The device of claim 7, wherein said signal detector further includes digital logic for selecting an output of one of said asynchronous comparator and said synchronous comparator and filtering said selected output to detect said signal.

10. The device of claim 9, wherein said digital logic selects said output of said asynchronous comparator when said signal detector is operating in said second power mode and selects said output of said synchronous comparator when said signal detector is operating in said first power mode.

11. The device of claim 10, wherein said digital logic includes a reference clock counter connected to count pulses of a reference clock signal and a signal counter connected to count pulses from said selected output of said synchronous comparator or said asynchronous comparator, said digital logic detecting said signal when said signal counter overflows before said reference clock counter overflows.

12. The device of claim 11, wherein said reference clock signal is a first clock signal when said signal detector is in said first power mode and a second clock signal having a lower frequency than said first clock signal when said signal detector is in said second power mode.

13. The device of claim 5, wherein said signal detector operates in said first power mode until said signal is no longer detected by said synchronous comparator.

14. The device of claim 13, wherein said power controller selects said first power mode for said device when said asynchronous comparator detects said signal and selects said second power mode for said device when said synchronous comparator no longer detects said signal.

15. The device of claim 1, further comprising:
a receiver connected to said serial interface port for receiving serialized data from said serial link, said receiver containing said signal detector; and
a transmitter connected to said serial interface port for transmitting serialized data over said serial link.

16. The device of claim 15, wherein said power controller selects between said first power mode and said second power mode for said receiver and selects between said first power mode and no power for said transmitter.

17. The device of claim 16, wherein said power controller selects no power for said transmitter when said second power mode is selected for said receiver and selects said first power mode for said transmitter when said first power mode is selected for said receiver.

18. A computer system including a plurality of serially connected endpoints, each of said endpoints including a transmitter and a receiver, each of said endpoints further comprising:

a serial interface port connected to a serial link for serializing and de-serializing data transmitted to and from said endpoint over said serial link;

a signal detector within said receiver and connected to said serial interface port to detect the presence of a signal received at said serial interface port; and a power controller connected to said transmitter and said receiver to select a first power mode for said receiver when said signal detector detects said signal and a second power mode for said receiver when said signal is not detected by said signal detector; and a fast clock generator connected to provide a fast clock signal to said receiver in said first power mode; and a slow clock generator connected to provide a slow clock signal having a lower frequency than said fast clock signal to said receiver in said second power mode.

19. The computer system of claim 18, further comprising: a synchronous comparator and an asynchronous comparator.

20. The computer system of claim 18, wherein each of said endpoints is associated with an input/output device.

* * * * *